(12) United States Patent
Van Baelen et al.

(10) Patent No.: US 8,429,786 B2
(45) Date of Patent: Apr. 30, 2013

(54) CONNECTION DEVICE FOR THE ARTICULATED CONNECTION OF A WIPER BLADE TO A WIPER ARM

(75) Inventors: David Van Baelen, Winksele (BE); Klaus-Juergen Westermann, Bad Herrenalb (DE); Ursula Westermann, legal representative, Bad Herrenalb (DE); Bernhard Geppert, Karlsruhe (DE); Yves Janssis, Sint-Truiden (BE); Dirk Herinckx, Dries-Linter (BE)

(73) Assignee: Robert Bosch GmbH, Stuttgart (DE)

( * ) Notice: Subject to any disclaimer, the term of this patent is extended or adjusted under 35 U.S.C. 154(b) by 782 days.

(21) Appl. No.: 12/599,091

(22) PCT Filed: Mar. 19, 2008

(86) PCT No.: PCT/EP2008/053275
§ 371 (c)(1),
(2), (4) Date: Dec. 7, 2009

(87) PCT Pub. No.: WO2008/135308
PCT Pub. Date: Nov. 13, 2008

(65) Prior Publication Data
US 2011/0072607 A1 Mar. 31, 2011

(30) Foreign Application Priority Data
May 7, 2007 (DE) .......................... 10 2007 021 333

(51) Int. Cl.
*B60S 1/38* (2006.01)
*B60S 1/40* (2006.01)
(52) U.S. Cl.
USPC ............... 15/250.32; 15/250.43; 15/250.201; 15/250.361

(58) Field of Classification Search ............... 15/250.32, 15/250.33, 250.361, 250.43, 250.44, 250.351, 15/250.201, 250.31
See application file for complete search history.

(56) References Cited

U.S. PATENT DOCUMENTS
7,299,520 B2   11/2007   Huang
7,337,489 B2    3/2008   Huang FOREIGN PATENT DOCUMENTS
| DE | 10122764 A1 | 2/2003 |
| DE | 10340139 A1 | 3/2005 |
| WO | 02/40328 A1 | 5/2002 |
| WO | 2005/039944 A1 | 5/2005 |

OTHER PUBLICATIONS
PCT/EP2008/053275 International Search Report.

*Primary Examiner* — Gary Graham
(74) *Attorney, Agent, or Firm* — Michael Best & Friedrich LLP

(57) ABSTRACT

The invention relates to a connection device (10) for the articulated connection of a wiper blade (28, 30) to a wiper arm, wherein a connection element (12, 120, 126) is tightly connected to the free end of the wiper arm, and the connection element is connected in an articulated manner via mounting means (88, 122, 124) to an adapter (22, 24), and the adapter is tightly seated on a support element (28) of the wiper blade (28, 30). It is suggested that a base cover (18), which surrounds the adapter (22, 24) and which can be attached to the adapter or to the support element (28), has a guide rail (66) running in the longitudinal direction (136), and that a push-spring (16) is mounted thereon and is adjustable in the longitudinal direction (136), and that the push-spring can be attached to a guide block (112) of the base cover (18) in different positions with different offset distances (114, 116, 118) in the longitudinal direction (136) of the guide rail (66) by means of locking means (68, 70, 72), wherein the guide block is connected to the end of the guide rail (66) on the wiper arm side.

20 Claims, 4 Drawing Sheets

CONNECTION DEVICE FOR THE ARTICULATED CONNECTION OF A WIPER BLADE TO A WIPER ARM

BACKGROUND OF THE INVENTION

The invention is based on a connection device for the articulated connection of a wiper blade to a wiper arm.

WO 02/40328 A1 discloses a connection device of this type. It comprises an adapter in the form of a sheet metal claw, a plastic retaining spring and a joining element connected fixedly to the wiper arm. The adapter is fastened by means of claws and/or by welding to a support element of the wiper blade in the form of two spring rails running in parallel. Said adapter has a U shaped cross sectional profile, with, starting from a base part adjacent to the support element, side walls being bent away approximately by 90° from the support element. Openings into which a bearing bolt is inserted in a rotationally fixed manner are provided in the side walls. The retaining spring, which is guided laterally between the side walls of the connection element, is mounted pivotably on said bearing bolt by means of a hub. The retaining spring has latching means and retaining means with which it is clipped into the profile, which is open toward the wiper blade, of the joining element. In the fitted position, the joining element engages from the outside both over the retaining spring and over the side walls of the adapter.

A similar connection device for the articulated connection of a wiper blade to a wiper arm is known from DE 103 47 637 A1. In this case, the adapter, which is in the form of a sheet metal claw, has a central longitudinal web which faces away from the support element of the wiper blade and into which a pivot spindle, which runs transversally, is inserted in a rotationally fixed manner. The retaining spring is mounted pivotably on the pivot spindle, which protrudes in a floating manner on both sides of the longitudinal web, by means of bearing openings which are arranged in lateral spring tongues. The retaining spring, which is manufactured from plastic, surrounds the sheet metal claw from the outside and is clipped by means of latching elements and retaining elements into the joining element which is open toward the wiper blade and is connected fixedly to the wiper arm. The adapter is firstly guided laterally by means of inner guide webs on the sheet metal claw and is secondly inserted at its side walls in the joining element in a manner free from play. For this purpose, use is made of a push button which is provided in a cover wall of the retaining spring at the end of a spring tongue and, in the fitted state, latches into a matching latching hole in a cover wall of the joining element.

Finally, DE 103 40 139 A1 discloses a connection device which has an adapter in the form of a sheet metal claw. The latter is fastened to the support element by means of claws while a central web extends in the longitudinal direction on the side facing away from the support element. A bearing element in the form of an open hub, in which a matching bearing element of a retaining spring is mounted, is integrally formed on an end side of the adapter. The retaining spring has a guide slot with which it is guided laterally on the central web. To limit the pivoting movement between the wiper blade and the wiper arm, the retaining spring has a catch hook which latches onto a projection on the central web during installation and can be released by a push button. Finally, a cover cap is clipped onto the adapter such that the latter and the retaining spring are protected from the surroundings.

SUMMARY OF THE INVENTION

According to the invention, a base cover which surrounds the adapter and can be fastened thereto or to the support element has a guide rail which runs in the longitudinal direction. A push spring is mounted displaceably in the longitudinal direction on said guide rail, said push spring being fixable by latching means in various positions in the longitudinal direction of the guide rail at different distances from a guide block of the base cover. The guide block adjoins that end of the guide rail which is on the wiper arm side. In this case, the base cover is expediently seated on the adapter by means of a fastening profile. The fastening profile can be designed as a clip such that it can be clipped onto the adapter transversally with respect to the longitudinal direction thereof.

According to a refinement of the invention, the guide rail has, on its longitudinal sides, longitudinal grooves in which longitudinal ribs of the push spring are guided. Said tongue and groove connection can also be designed the other way around such that the longitudinal ribs are located on the base cover and the longitudinal grooves on the push spring. In order to fix the push spring in the various positions, the guide rail has, at the corresponding locations of its extent in the longitudinal direction, as latching means two mutually opposite latching depressions which match two corresponding latching connectors on the push spring. The latching connectors are supported flexibly on the push spring such that they latch into the latching depressions when the push spring is pushed onto the guide rail. The latching connectors are released by pressure from the outside on the side walls of the push spring, and therefore the push spring can be adjusted into a different latching position or can be removed.

The connection device according to the invention is suitable in order to connect wiper arms, which are distinguished in particular by different joining elements and permit either a top lock connection or a side lock connection, to a wiper blade in an articulated manner. For this purpose, the push spring can be fixed in various positions in the longitudinal direction on the base cover such that its articulation means are placed at the correct location of the wiper blade in accordance with the joining element, used in each case, of the wiper arm.

According to a refinement of the invention, the connection device has a retaining spring which, on its end side, has a bearing roller which, together with a corresponding bearing element on the push spring, forms a hinge. The retaining spring is expediently inserted on the end side into a receiving profile of a joining element of the wiper arm and latched by a push button at the end of a spring tongue latching into a latching hole of the receiving profile. The latching hole is expediently located in a cover wall of the receiving profile, but may alternatively also be arranged in a side wall. In the embodiment with a retaining spring, the push spring is fixed in a position which is at a large distance from a guide block of the base cover so that the retaining spring has a sufficient pivoting angle during operation and ensures good lateral guidance. For this purpose, the inner sides of the side walls of the retaining spring are guided on the outer sides of the guide block of the base cover.

The retaining spring is expediently retained in the longitudinal direction in the fitted position by means of transverse pegs which are provided on the base cover and engage in corresponding guides of the retaining spring. The guides and the position of the transverse pegs are designed in such a manner that they do not impair the pivoting movement of the retaining spring, but, in the operating position, prevent displacement of the retaining spring in the longitudinal direction relative to the push spring. The transverse pegs can be formed in an advantageous manner by means of a transverse pin which is fitted in a central web of the adapter and protrudes outward for a distance out of the side walls of the guide block through openings.

According to a further refinement of the invention, in a central position of the push spring, an intermediate space, into which an articulation head of a different joining element fits, is formed between said push spring and the guide block, with an extension of a cover wall of the push spring covering the intermediate space and engaging in a holder of the guide block. In the case of this articulated connection in the manner of a top lock connection, the articulation head of the joining element is brought by its articulation spindle into the intermediate space before the push spring is latched in the associated position. In the fitted state, an extension on the cover wall of the push spring covers the intermediate space and engages in a holder of the guide block such that the articulation head is held pivotably between the guide block and the push spring.

In the case of another possibility of the articulated connection of the wiper blade to a joining element according to the side lock principle, the push spring takes up a position at the end of the guide rail, which end faces away from the drive side end of the wiper blade. By means of its side walls, said push spring laterally covers the guide block for a distance, while the extension of the cover wall engages in the holder of the guide block. Bearing openings are provided in the side walls of the push spring. An articulation pin of the associated joining element is pushed laterally into said bearing openings during the installation and is therefore mounted pivotably before the wiper arm is rotated into its operating position. In the latter, a bridge, which is offset with respect to the articulation pin in the longitudinal direction toward the drive side end of the joining element, covers the cover wall of the push sleeve and, in the operating position, is blocked by its angled end in the longitudinal direction of the articulation pin. A bearing sleeve can expediently be inserted into the bearing openings in order to reinforce the mounting.

BRIEF DESCRIPTION OF THE DRAWINGS

Further advantages emerge from the description below of the drawing. Exemplary embodiments of the invention are illustrated in the drawing. The drawing, the description and the claims contain numerous features in combination. A person skilled in the art will expediently also consider the features individually and put them together to form meaningful further combinations.

In the drawing.

DETAILED DESCRIPTION

Figure 1:
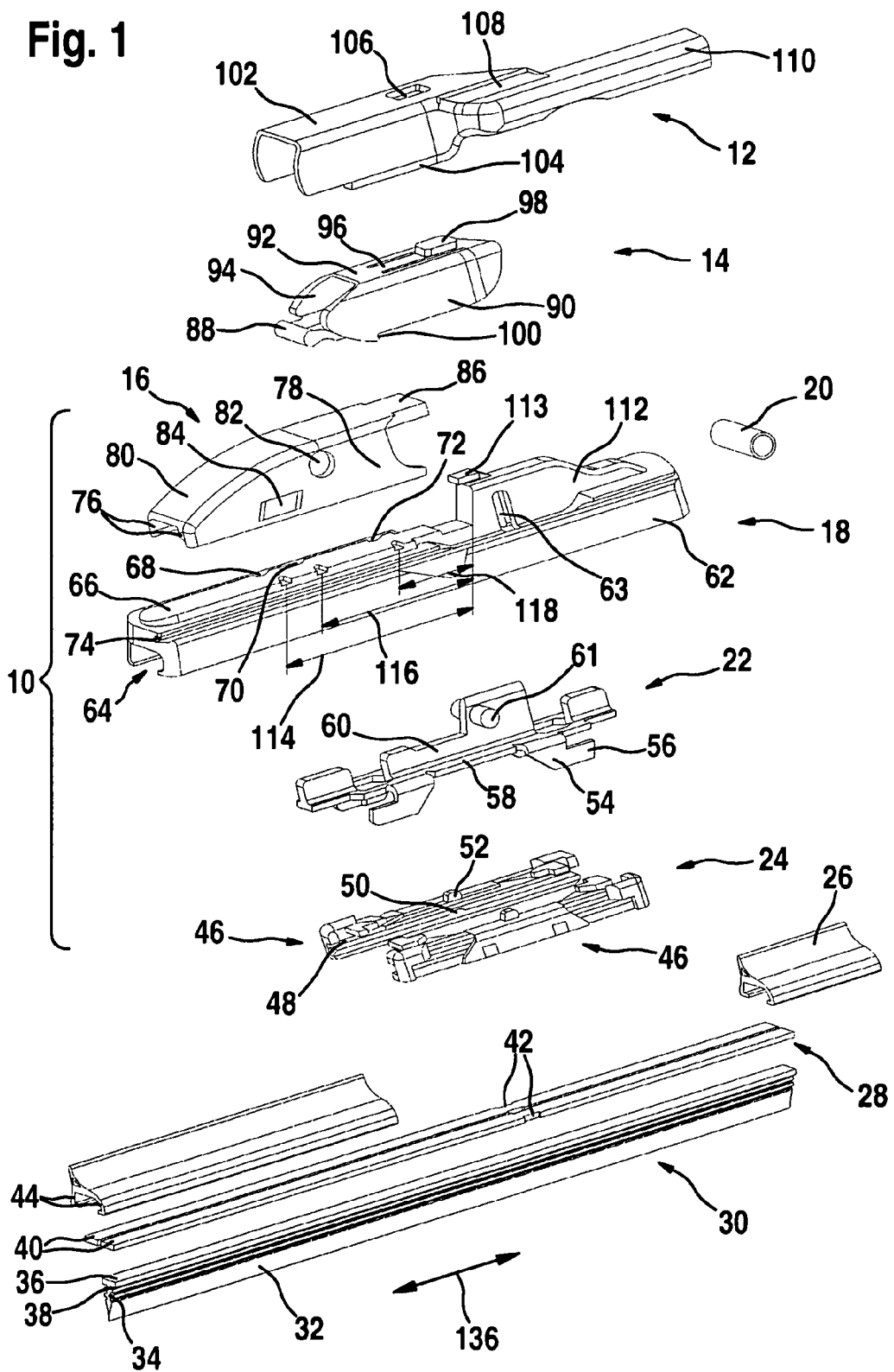
FIG. 1 shows a perspective view of a connection device according to the invention in an exploded illustration together with a wiper blade and a joining element.

A windscreen wiper according to FIG. 1 comprises a joining element 12 which forms the output end of a wiper arm (not illustrated), and a connection device 10 for the articulated connection of the joining element 12 to a wiper blade which contains a wiper rubber 30, a support element 28 in the form of two spring rails 40 and optionally a clip on spoiler 26. The wiper rubber 30 has a wiper lip 32 which is connected via a tilting web 34 to a top strip 36. The latter has two lateral longitudinal grooves 38 into which spring rails 40 are inserted. The clip on spoiler 26 is seated on the spring rails 40, which protrude for a distance laterally out of the longitudinal grooves 38, on both sides of an adapter 22, 24 by means of a guide profile 44.

In the embodiment according to FIG. 1, the connection device 10 comprises a multipart adapter 22, 24, a base cover 18 and a push spring 16. The base cover 18 and the push spring 16 form the core elements of the connection device 10.

The connection device 10 is connected fixedly to the support element 28 by the adapter 22, 24. For this purpose, a base adapter 24, which is divided in the longitudinal direction 136, comprises those parts of the spring rails 40 which protrude out of the top strip 36 together with the guide grooves 48 of said spring rails. Cams 50 in the guide grooves 48 fix the parts of the base adapter 24 in the longitudinal direction 136 of the spring rails 40 by engaging in corresponding cutouts 42 of the spring rails 40. The parts 46 of the base adapter 24 are held together by a functional adapter 22 in the form of a sheet metal claw which, together with feet 54, surrounds the sides of the base adapter 24. During the installation, tabs 56 which are integrally formed on the feet 54 and pointing in the longitudinal direction 136 are bent over into lateral cutouts of the base adapter 24 and therefore join the parts fixedly together. The parts 46 of the base adapter 24 and therefore also the spring rails 40 are aligned with each other by means of centering cams 52 which engage in the corresponding cutouts in a base 58 of the functional adapter 22. Further cutouts and the edges of the base 58 together with corresponding projections of the base adapter 24 form form fitting connections between the base adapter 24 and the functional adapter 22, thus providing a good connection between the functional adapter 22, the parts 46 of the base adapter 24 and the support element 28.

On the side facing away from the support element 28, the functional adapter 22 has a central web 60, with various incisions producing a suitable longitudinal contour in order to permit the movement clearance for different wiper arms. The base cover 18 is clipped by its fastening profile 64 onto the fitted adapter 22, 24 transversally with respect to the longitudinal direction 136, with the side walls 62 of the base cover 18 covering the sides of the adapter 22, 24. On the side facing away from the fastening profile 64, the base cover 18 has a guide rail 66 which is adjoined in the longitudinal direction 136 by a guide block 112. The guide rail 66 and the guide block 112 substantially cover the central web 60 of the functional adapter 22 to the outside. In the region of the guide block 112, the base cover 18 has lateral openings 63 through which a transverse pin 61 protrudes to the outside in the fitted state. Said transverse pin is inserted into the central web 60 of the functional adapter 22 and fixes the base cover 18 in the longitudinal direction 136.

On its outer sides, the guide rail 66 has longitudinal grooves 74 into which longitudinal ribs 76 of the push spring 16 engage. The push spring 16 which can thus be displaced in the longitudinal direction 136 on the base cover 18 can be fixed by latching means at different distances 114, 116, 118 from the guide block 112. Said latching means are formed by latching depressions 68, 70, 72 into which resiliently flexible latching connectors in the interior of the push spring 16 latch. In order to remove or adjust the push spring 16, the latching connectors can be disengaged by pressure on gripping strips 84 on the outer walls 78 of the push spring 16.

Figure 2:
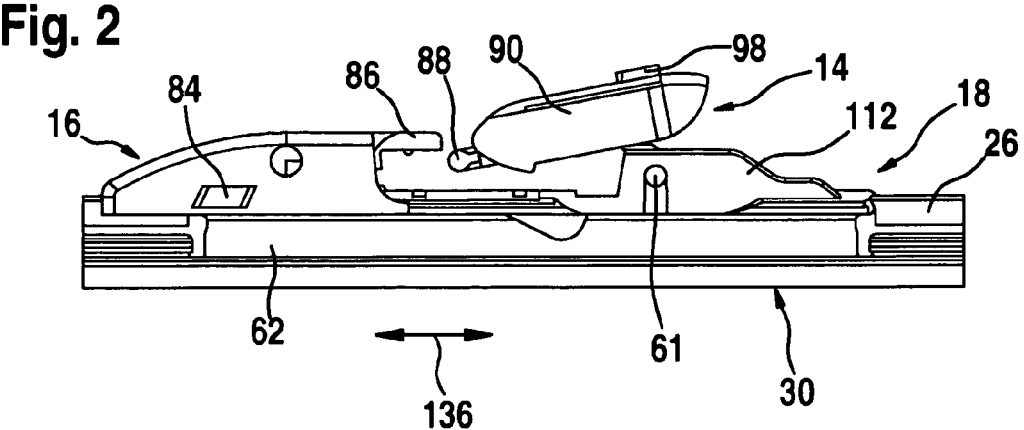
FIG. 2 shows a side view of a partially fitted connection device for a top lock design.
Figure 3:
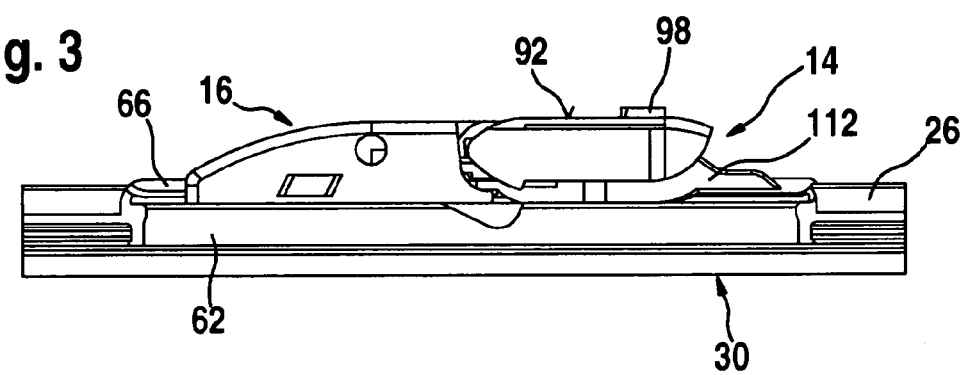
FIG. 3 shows a side view of a fitted connection device according to FIG. 2, FIG. 4 and FIG. 5 show variants to FIG. 3, FIG. 6 and FIG. 7 show side views of the embodiment according to FIG. 4 in different installation positions.

The side walls 78 of the push-spring 16 are connected to each other by a cover wall 80 which has an extension 86 toward the guide block 112. Depending in each case on the position of the spring rail 16 on the guide rail 66, the extension 86 engages to a greater or lesser extent in a holder 113 on the guide block 112. The different distances 114, 116, 118 of the push-spring 16 from the guide block 112 permit connection to different wiper arms. It is therefore possible, for example, for a wiper arm to be connected to the connection device 10 by a joining element 12 via a retaining spring 14 (FIG. 2 and FIG. 3). The joining element 12 is connected to a wiper arm (not illustrated) via a connecting profile 110. The connecting profile 110 is adjoined via a bent portion 108 by a laterally offset receiving profile 102, into the end side of which the retaining spring 14 can be inserted.

The retaining spring 14 has two side walls 90 which are connected to each other by a cover wall 92. In the cover wall 92, longitudinal slots form a spring tongue 96, on the free end of which an outwardly pointing push button 98 is integrally formed. When the retaining spring 14 is inserted into the receiving profile 102, the push button 98 latches into a corresponding latching hole 106 of the receiving profile 102. In the process, the retaining spring 16 bears by means of a stop 100 on the lower edge of the side wall 90 against a lower rib 104 of the receiving profile 102. For removal of the retaining spring 14, the latching is released by pressure on the push button 98.

On its end side facing the push spring 16, the retaining spring 14 has a bearing roller 88 which, in the fitted state, engages in the push-spring 16, latches to a corresponding bearing element and forms a hinge. In the process, the extension 86 of the cover wall 80 of the push-spring 16 engages in a cutout 94 between the side walls 90 of the retaining spring.

During the installation, the retaining spring 14 is first of all introduced into the push-spring 16 and the bearing roller 88 latched before the push-spring 16 is displaced into the position belonging to the latching depression 68. The retaining spring 14 is subsequently inserted into the receiving profile 102 of the joining element 12 and latched. FIG. 3 shows the fitted operating position. In this position, those parts of the transverse pin 61 which protrude over the base cover 18 can engage in guides of the retaining spring 14, with the result that the latter is retained in the longitudinal direction 136, but is freely movable in the pivoting direction.

Figure 4:
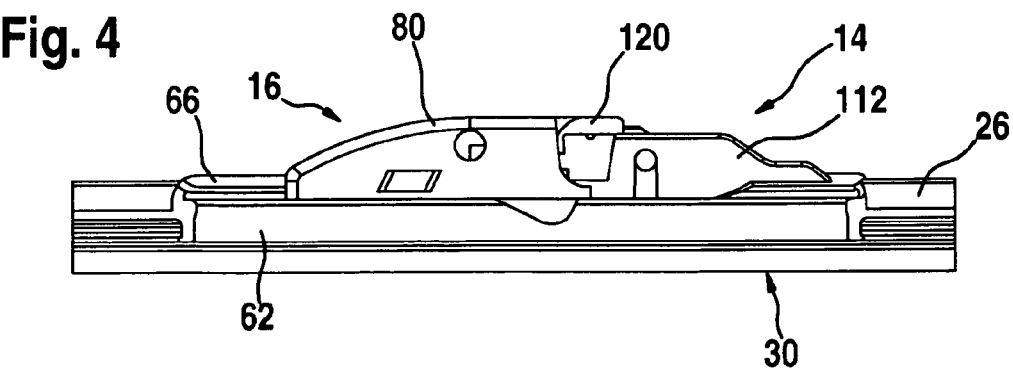
Figure 6:
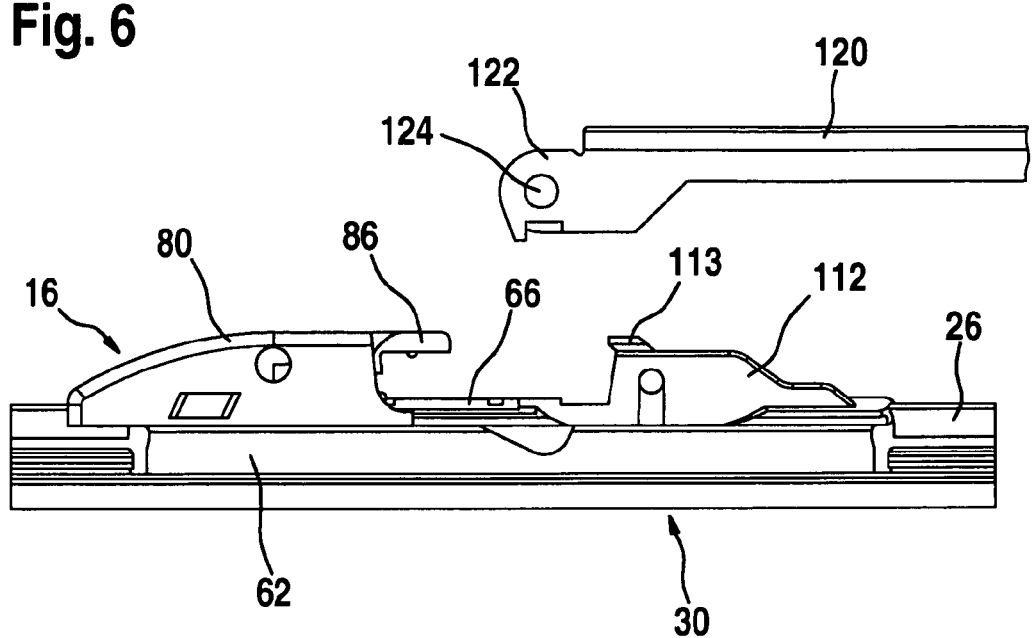
Figure 7:
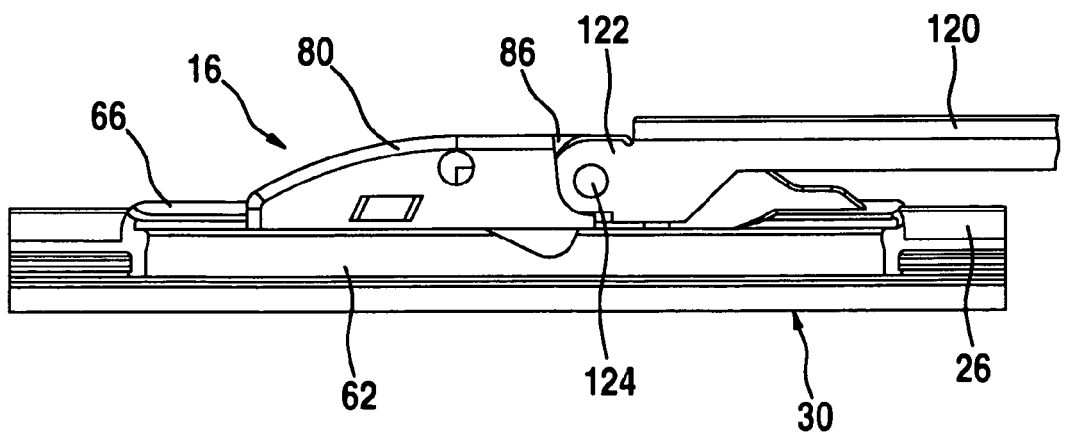

In contrast to the embodiment according to FIG. 3, in the case of the embodiment according to FIG. 4 the push-spring 16 takes up a position on the guide rail 66 that corresponds to the latching depression 70. Said position is suitable for a joining element 120 of a wiper arm with an articulation head 122 which has an articulation spindle 124 (FIG. 6). While the push-spring 16 is in its starting position, the articulation head 122 of the joining element 120 is fitted into the intermediate space between the push-spring 16 and the guide block 112. The push-spring 16 is then pushed into the central latching position, with the extension 86 of the cover wall 80 of the push-spring 16 engaging via the articulation head 122 into the holder 113 on the guide block 112 such that the wiper blade 26, 28, 30 is mounted on the wiper arm with the joining element 120 in a manner such that it can pivot about the articulation spindle 124.

Figure 5:
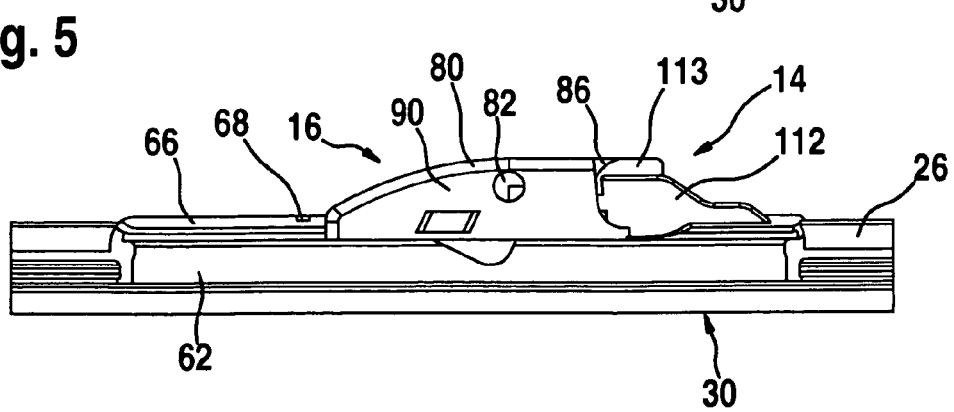
Figure 8:
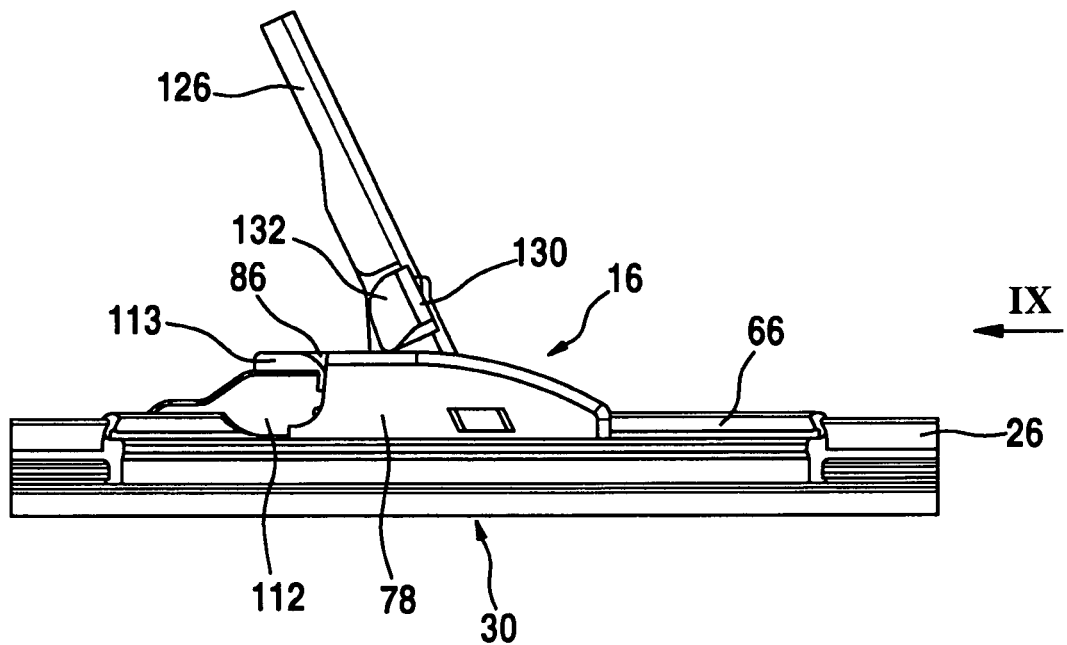
FIG. 8 shows a side view of the embodiment according to FIG. 5 in the partially fitted state.
Figure 9:
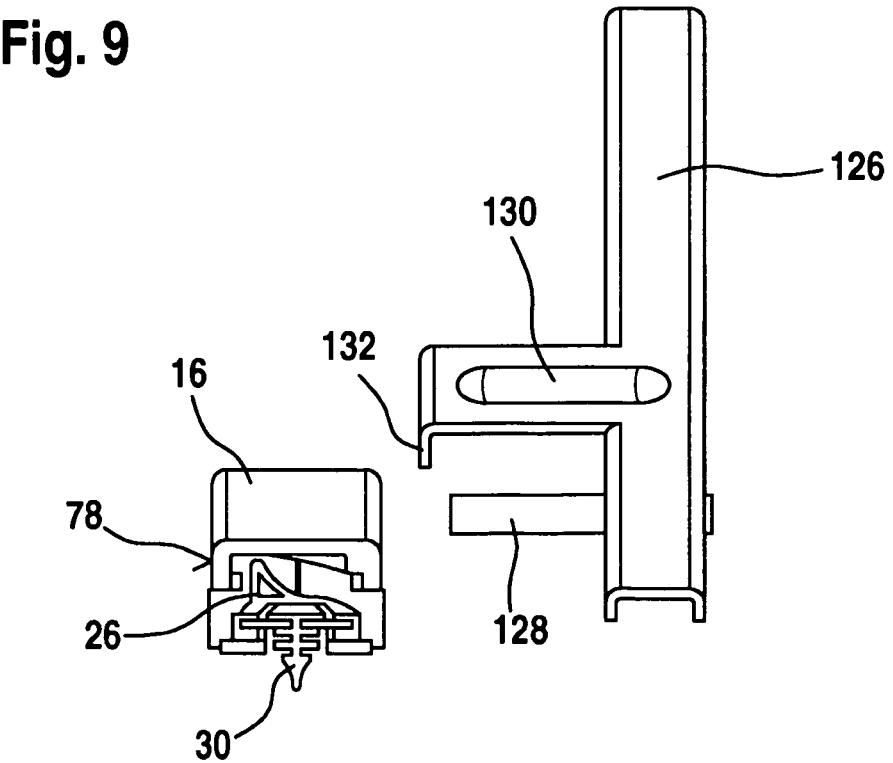
FIG. 9 shows a view in the direction of an arrow IX in FIG. 8.

In contrast to the embodiments according to FIGS. 3 and 4, in the case of the embodiment according to FIG. 5 the push-spring 16 is in a third position which corresponds to the latching depressions 72. The latter are located closest to the guide block 112, and therefore the side walls 78 of the push-spring 16 cover the guide block 112 laterally to a great extent, and the extension 86 of the cover wall 80 of the push-spring engages deeply in the holder 113 on the guide block 112. Said position is provided for a wiper arm with a joining element 126 which is customarily used for a side lock connection between the wiper arm and the wiper blade 26, 28, 30. In the vicinity of its free end, the joining element 126 has an articulation pin 128, in relation to which a bridge 130 having an angled end 132 is provided in a manner offset toward the driving side. During the installation, the push-spring 16, which is fitted onto the base cover 18, is pushed laterally onto the articulation pin 128 with the joining element 126 being in an angled position (FIG. 8). Mutually opposite bearing openings 82 in the side walls 78 of the push-spring 16 serve for this purpose. The bearing openings 82 are expediently connected to each other by a bearing sleeve 20. After installation of the wiper blade 26, 28, 30 together with the connection device 10, the joining element 126 is pivoted into the operating position which runs approximately parallel to the wiper rubber 30. In said position, the angled end 132 of the bridge 130 engages over the side wall 78, which faces away from the joining element 126, of the push-spring 16 which is therefore secured on the articulation pin 128 in the longitudinal direction thereof.

The invention claimed is:

1. A connection device (10) for the articulated connection of a wiper blade (28, 30) to a wiper arm, to the free end of which a joining element (12, 120, 126) is fixedly connected, said joining element being connected in an articulated manner via bearing means (88, 122, 124) to an adapter (22, 24) which is seated fixedly on a support element (28) of the wiper blade (28, 30), characterized in that a base cover (18) which surrounds the adapter (22, 24) and can be fastened thereto or to the support element (28) has a guide rail (66) which runs in the longitudinal direction (136) and on which a push-spring (16) is mounted displaceably in the longitudinal direction (136), said push-spring being fixable by latching means (68, 70, 72) in various positions in the longitudinal direction (136) of the guide rail (66) at different distances (114, 116, 118) from a guide block (112) of the base cover (18), which guide block adjoins that end of the guide rail (66) which is on the wiper arm side.

2. The connection device (10) as claimed in claim 1, characterized in that the base cover (18) is seated on the adapter (22, 24) by means of a fastening profile (64).

3. The connection device (10) as claimed in claim 2, characterized in that the guide rail (66) has, on its longitudinal sides, longitudinal grooves (74) in which longitudinal ribs (76) of the push-spring (16) are guided.

4. The connection device (10) as claimed in claim 3, characterized in that the guide rail (66) has, at various positions of its extent in the longitudinal direction (136), as latching means two mutually opposite latching depressions (68, 70, 72).

5. The connection device (10) as claimed in claim 4, characterized in that the latching connectors can be released by pressure from the outside on the side walls (78) of the push-spring (16).

6. The connection device (10) as claimed in claim 5, characterized in that the adapter comprises a functional adapter (22) and two base adapter parts (46) of a base adapter (24), which base adapter parts can be placed laterally onto the support element (28) and are held together by the functional adapter (22).

7. The connection device (10) as claimed in claim 6, characterized in that a retaining spring (14) of the connection device (10) has, on an end side, a bearing roller (88) configured to partially form a hinge.

8. The connection device (10) as claimed in claim 7, characterized in that a cover wall (92) of the retaining spring (14) has a spring tongue (96), at the free end of which a push button

(98) is provided, which push button can latch into a latching hole (106) of a receiving profile (102) of the joining element (12).

9. The connection device (10) as claimed in claim 1, characterized in that the guide rail (66) has, on its longitudinal sides, longitudinal grooves (74) in which longitudinal ribs (76) of the push-spring (16) are guided.

10. The connection device (10) as claimed in claim 1, characterized in that the guide rail (66) has, at various positions of its extent in the longitudinal direction (136), as latching means two mutually opposite latching depressions (68, 70, 72).

11. The connection device (10) as claimed in claim 10, characterized in that the latching connectors can be released by pressure from the outside on the side walls (78) of the push-spring (16).

12. The connection device (10) as claimed in claim 1, characterized in that the adapter comprises a functional adapter (22) and two base adapter parts (46) of a base adapter (24), which base adapter parts can be placed laterally onto the support element (28) and are held together by the functional adapter (22).

13. The connection device (10) as claimed in claim 1, characterized in that a retaining spring (14) of the connection device (10) has, on an end side, a bearing roller (88) configured to partially form a hinge.

14. The connection device (10) as claimed in claim 13, characterized in that a cover wall (92) of the retaining spring (14) has a spring tongue (96), at the free end of which a push button (98) is provided, which push button can latch into a latching hole (106) of a receiving profile (102) of the joining element (12).

15. The connection device (10) as claimed in claim 13, characterized in that inner sides of the side walls (90) of the retaining spring (14) are guided on outer sides of the guide block (112) of the base cover (18), the retaining spring (14) being retained in the longitudinal direction (136) in a fitted position by means of transverse pegs (61) which are provided on the base cover (18).

16. The connection device (10) as claimed in claim 15, characterized in that the transverse pegs (21) are formed by a transverse pin which is fitted in a central web (60) of the adapter (22, 24) and protrudes outward for a distance out of the side walls (62) of the guide block (112) through openings (63).

17. The connection device (10) as claimed in claim 1, characterized in that, in a central position of the push-spring (16), an intermediate space, into which an articulation head (122) of a joining element (120) fits, is formed between said push-spring and the guide block (112), with an extension (86) of a cover wall (80) of the push-spring (16) covering the intermediate space and engaging in a holder (113) of the guide block (112).

18. The connection device (10) as claimed in claim 1, characterized in that, in a position which faces away from a drive-side end of the wiper blade (28, 30), the push-spring (16), by means of its side walls (78), laterally covers the guide block (112) for a distance, and an extension (86) of the cover wall (80) engages in a holder (113) of the guide block (112), a bearing opening (82) being provided in at least one bearing wall (78).

19. The connection device (10) as claimed in claim 18, characterized in that a bearing sleeve (20) is inserted into two mutually opposite bearing openings (82).

20. A wiper blade (28, 30) with a connection device (10) for the articulated connection of the wiper blade (28, 30) to a wiper arm, to the free end of which a joining element (12, 120, 126) is fixedly connected, said joining element being connected in an articulated manner via bearing means (88, 122, 124) to an adapter (22, 24) which is seated fixedly on a support element (28) of the wiper blade (28, 30), characterized in that a base cover (18) which surrounds the adapter (22, 24) and can be fastened thereto or to the support element (28) has a guide rail (66) which runs in the longitudinal direction (136) and on which a push-spring (16) is mounted displaceably in the longitudinal direction (136), said push-spring being fixable by latching means (68, 70, 72) in various positions in the longitudinal direction (136) of the guide rail (66) at different distances (114, 116, 118) from a guide block (112) of the base cover (18), which guide block adjoins that end of the guide rail (66) which is on the wiper arm side.

\* \* \* \* \*

UNITED STATES PATENT AND TRADEMARK OFFICE
CERTIFICATE OF CORRECTION

PATENT NO.        : 8,429,786 B2                                          Page 1 of 1
APPLICATION NO.   : 12/599091
DATED             : April 30, 2013
INVENTOR(S)       : Van Baelen et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 811 days.

Signed and Sealed this
Eighth Day of September, 2015

Michelle K. Lee
*Director of the United States Patent and Trademark Office*